(12) United States Patent
Briglia

(10) Patent No.: US 10,627,004 B2
(45) Date of Patent: *Apr. 21, 2020

(54) VALVE ADAPTATION FOR TOP ENTRY VALVE IN CRYOGENIC SERVICE

(71) Applicant: L'Air Liquide, Societe Anonyme pour l'Etude et l'Exploitation des Procedes Georges Claude, Paris (FR)

(72) Inventor: Alain Briglia, Houston, TX (US)

(73) Assignee: L'Air Liquide, SociétéAnonyme pour l'Etude et l'Exploitation des Procédés Georges Claude, Paris (FR)

(*) Notice: Subject to any disclaimer, the term of this patent is extended or adjusted under 35 U.S.C. 154(b) by 12 days.

This patent is subject to a terminal disclaimer.

(21) Appl. No.: 15/775,173

(22) PCT Filed: Nov. 10, 2015

(86) PCT No.: PCT/CN2015/094207
§ 371 (c)(1),
(2) Date: May 10, 2018

(87) PCT Pub. No.: WO2017/079899
PCT Pub. Date: May 18, 2017

(65) Prior Publication Data
US 2018/0328509 A1 Nov. 15, 2018

(51) Int. Cl.
*F16K 27/02* (2006.01)
*F16K 27/08* (2006.01)
(Continued)

(52) U.S. Cl.
CPC .............. *F16K 27/02* (2013.01); *F16K 27/08* (2013.01); *F16K 43/00* (2013.01); *F17C 13/04* (2013.01); *F17C 2205/0323* (2013.01)

(58) Field of Classification Search
CPC .......... F16K 27/08; F16K 43/00; F16K 27/02; F17C 13/04; Y10T 137/6065; Y10T 137/0402; Y10T 137/0491
See application file for complete search history.

(56) References Cited

U.S. PATENT DOCUMENTS 4,285,498 A 8/1981 Nightingale
4,641,681 A 2/1987 Ikematsu et al.
(Continued)

FOREIGN PATENT DOCUMENTS

CN 104089044 10/2014
EP 1 936 255 6/2008
(Continued)

OTHER PUBLICATIONS

International Search Report and Written Opinion for corresponding PCT/CN2015/094207, dated Mar. 29, 2016.
(Continued)

*Primary Examiner* — Mary E McManmon
*Assistant Examiner* — Kevin R Barss
(74) *Attorney, Agent, or Firm* — Elwood L. Haynes

(57) ABSTRACT

An in situ retrofit assembly for a top entry valve includes an annular conduit (100) configured to conform with a seat support (106) at the distal end (207) and a valve body extension (208) with an interior annular region (301). The valve body extension (208) comprises an inlet port (209) fluidically connected to the annular area (301). A gland packing push plate (211) is configured to allow the annular conduit (100) to pass through thereby forming an outlet port (212). This allows the removal of a portion of the fluid from the cold box for downstream processing or manipulation as desired.

8 Claims, 2 Drawing Sheets

(51) Int. Cl.
*F17C 13/04* (2006.01)
*F16K 43/00* (2006.01)

(56) References Cited

U.S. PATENT DOCUMENTS

| | | | |
|---|---|---|---|
| 4,815,692 A | | 3/1989 | Loiseau et al. |
| 4,844,411 A | | 7/1989 | Nelson |
| 5,013,009 A | | 5/1991 | Nelson |
| 5,476,117 A | * | 12/1995 | Pakula ................. F16K 41/026 |
| | | | 137/312 |
| 6,098,674 A | | 8/2000 | Germain et al. |
| 6,302,374 B1 | | 10/2001 | Fink |
| 7,284,570 B1 | | 10/2007 | Gracik et al. |
| 2006/0005792 A1 | * | 1/2006 | Bosler .................... B23K 11/26 |
| | | | 123/41.41 |
| 2008/0023663 A1 | * | 1/2008 | Pereira Madeira ..... F02D 9/103 |
| | | | 251/301 |

FOREIGN PATENT DOCUMENTS

| | | |
|---|---|---|
| FR | 2 799 523 | 12/2001 |
| WO | WO 2014 021509 | 2/2014 |

OTHER PUBLICATIONS

International Search Report and Written Opinion for related PCT/CN2015/094206, dated Aug. 17, 2016.

\* cited by examiner

VALVE ADAPTATION FOR TOP ENTRY VALVE IN CRYOGENIC SERVICE

CROSS REFERENCE TO RELATED APPLICATIONS

This application is a § 371 of International PCT Application PCT/CN2015/094207, filed Nov. 10, 2015, which is herein incorporated by reference in its entirety.

BACKGROUND

Valves are commonly used in industry to restrict, divert, or blend flows of fluids. In the cryogenic industry, "top entry" valves are commonly used. These top entry valves present the advantage of eliminating flange connections (i.e. between the valve body and the bonnet), which represent a risk of leakage. Consequently, valves of this type eliminate the separate casing typically found in conventional valves, typically filled with mineral wool, thereby allowing for easy access to the valve internals in the case of leakage.

The absence of the separate casing filled with mineral wool implies that the valve and the connecting piping will need to be externally insulated, typically by being immersed with perlite inside the cryogenic cold box. This makes accessing the piping connected to the valve body virtually impossible, except by emptying the cold box of the perlite. This is a time consuming and expensive operation, resulting in extended plant outages.

In some cases, it can be desirable to access a stream internal to the cold box itself. For example, if the addition of a Helium-Neon enrichment column is envisioned. In the case where a top entry valve is in an appropriate location within the process cycle, the proposed invention would allow the top entry valve to be modified, in situ, to provide an exit and entry port for this process stream.

SUMMARY

An in situ retrofit assembly for a top entry valve is provided. The assembly includes a top entry valve body comprising a bonnet, stem, seat ring, seat support, and plug, wherein the bonnet, stem, seat ring, and plug have been removed in situ. An annular conduit with an exterior surface is disposed longitudinally within the top entry valve body. The annular conduit is configured such that the exterior surface of the distal end forms a fluid tight seal with the seat support. A valve body extension is configured to attach to the top entry valve body concentric with the annular conduit. The valve body extension includes an interior annular region, an inlet port fluidically connected to the annular area, and a gland packing configured to seal against the annular conduit. A gland packing push plate is configured to allow the annular conduit to pass through thereby forming an outlet port.

A method of in situ retrofitting an assembly for a top entry valve, using the above assembly is provided. This includes removing the bonnet, stem, seat ring and plug in situ. It also includes forming a fluid tight seal between the exterior surface of the distal end and the seat support.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
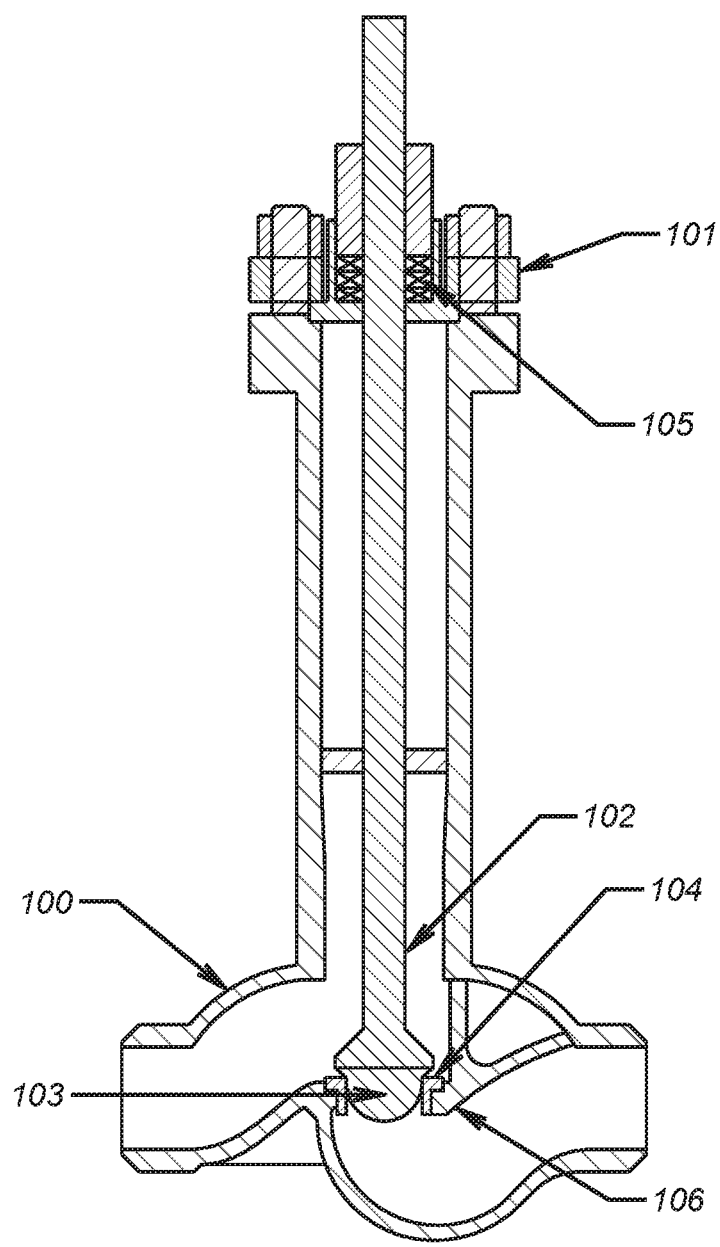
FIG. 1 illustrates a typical top entry valve as known to the prior art.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning to FIG. 1, a typical top entry valve used for cryogenic service is presented. As the name would suggest, this type of valve allows the internal parts to be accessed through the top, without having to completely remove the valve. A top entry globe valve will have a bonnet (101) which is bolted to the body and is removed to gain access. This valve will also have a valve stem (102) which passes through the bonnet, typically to a hand-wheel or other controlling means, and transmits linear motion to a valve member, such as the plug (103) of a globe valve. The plug (103) makes contact with the valve seat (104) thereby forming a leak-tight closure that stops the fluid flow through the valve. In order to prevent unwanted fluid leakage through the bonnet, typically a friction tolerant seal, such as packing (105) will be pressed into annular recesses known as glands.

Figure 2:
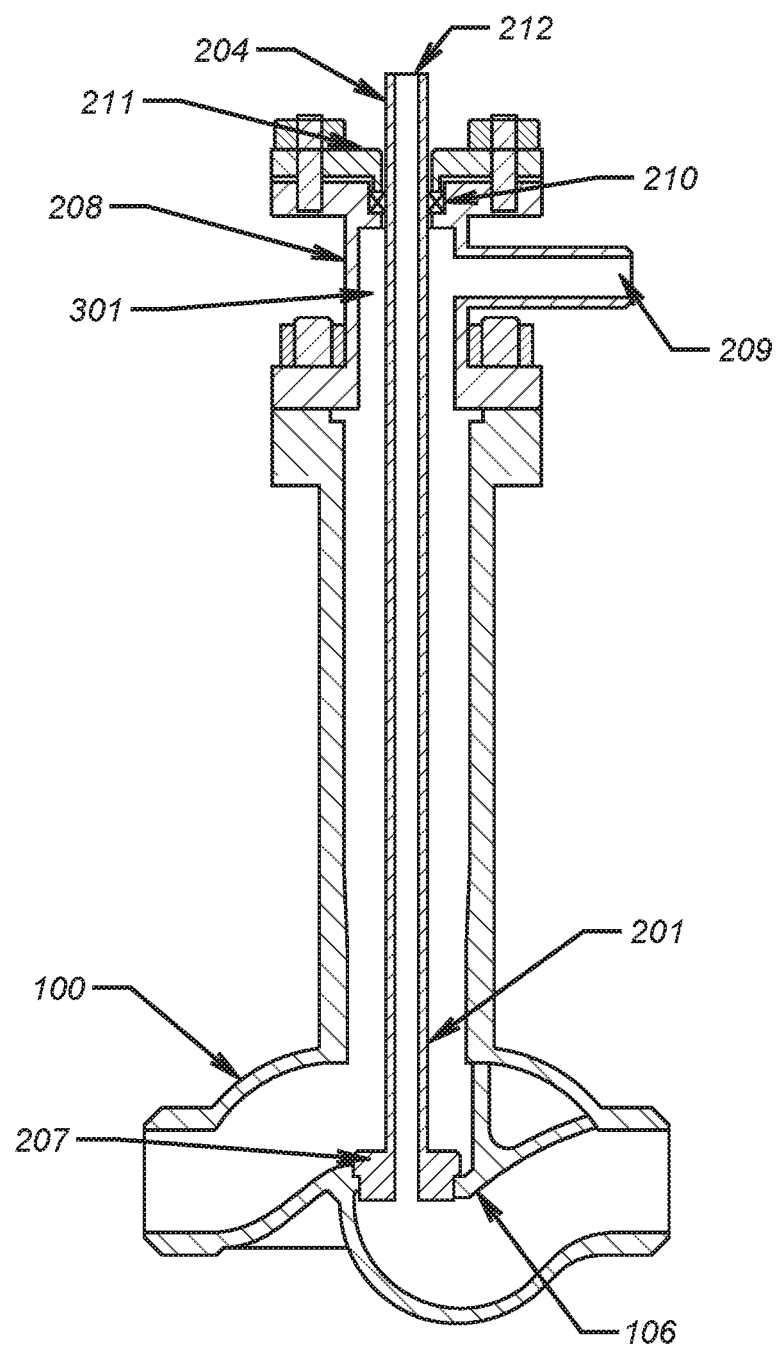
FIG. 2 illustrates one embodiment of the present invention.

Turning to FIG. 2, a top entry valve is shown with the original bonnet, stem, seat ring, and pug removed. These may be removed in situ, without having to remove the valve from the interconnected piping. If this valve is in cryogenic service, it will be imbedded within the cold box with only the top part of the valve body and the bonnet penetrating the cold box and being readily accessible. The rest of the cryogenic valve, will be surrounded by the cryogenic insulation (cryogel, perlite, etc), which would make removal of the valve body itself time consuming and expensive.

Inside the now empty valve body, an annular conduit (201) is introduced. The annular conduit (201) has an exterior surface disposed longitudinally within the top entry valve body (100), in a similar orientation as the valve stem had previously occupied. The annular conduit (201) is configured to conform with the seat support (106) at the distal end (207). The distal end of the annular conduit (201) may be threaded, which will allow it to interface and fit snugly within the seat support (106).

A valve body extension (208) is configured to attach to the top entry valve body (100) concentric with the annular conduit (201). The valve body extension (208) has an interior annular region (301), an inlet port (209) fluidically connected to the annular area (301), and a gland packing (210) configured to seal against the annular conduit (201). The valve body extension (208) has an internal volume (301) that is fluidically connected to the downstream portion of the top entry valve body. Hence, a fluid that is introduced into the inlet port (209) will pass around the annular conduit (201) within the valve body, and then proceed to exit the top entry valve, though a first fluid path.

A gland packing push plate (211) is configured to allow the annular conduit (201) to pass through thereby forming an outlet port (212). The outlet port (212) is fluidically connected to the upstream portion of the top entry valve body. Hence, a fluid that is introduced into the inlet side of the main valve body will pass through the annular conduit (201) and exit the outlet port (212), through a second fluid path. A gland packing push plate configured to form a fluid tight seal with the gland packing (210).

This then allows the removal of a portion of the fluid from the cold box (second fluid path), for downstream processing or manipulation as desired. Then at least a portion of this processed stream, or possibly an entirely unrelated stream, may then be returned to the cold box (first fluid path). The inlet port may be connected to cryogenic service. The outlet port may be connected to cryogenic service.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An in situ retrofit assembly for a top entry valve, comprising:
   a top entry valve body (100), comprising a bonnet (101), stem (102), seat ring (104), seat support (106), and plug (103), wherein the bonnet (101), stem (102), seat ring (104), and plug (103) have been removed in situ,
   an annular conduit (201) with a proximal end (204), a distal end (207), and an exterior surface disposed longitudinally within the top entry valve body (100) and configured such that the exterior surface of the distal end (207) forms a fluid tight seal with the seat support (106),
   a valve body extension (208) configured to attach to the top entry valve body (100) concentric with the annular conduit (201), wherein the valve body extension (208) comprises an annular region (301), an inlet port (209) fluidically connected to the annular region (301), and a gland packing (210) configured to seal against the proximal end (204) of the annular conduit (201),
   a gland packing push plate (211) configured to allow the proximal end (204) of the annular conduit (201) to pass through thereby forming an outlet port (212), the gland packing push plate (211) configured to form a fluid tight seal with the gland packing (210).

2. The in situ retrofit assembly for a top entry valve of claim 1, wherein the top entry valve body is installed in cryogenic service.

3. The in situ retrofit assembly for a top entry valve of claim 1, wherein the inlet port is connected to cryogenic service.

4. The in situ retrofit assembly for a top entry valve of claim 1, wherein the outlet port is connected to cryogenic service.

5. An in situ method to retrofit an assembly in a top entry valve, comprising:
   providing a top entry valve body (100), comprising a bonnet (101), stem (102), seat ring (104), seat support (106), and plug (103),
   removing the bonnet (101), stem (102), seat ring (104), and plug (103) in situ,
   providing an annular conduit (201) with a proximal end (204), a distal end (207), and an exterior surface disposed longitudinally within the top entry valve body (100)
   forming a fluid tight seal between the exterior surface of the distal end (207) and the seat support (106),
   providing a valve body extension (208) configured to attach to the top entry valve body (100) concentric with the annular conduit (201), wherein the valve body extension (208) comprises an annular region (301), an inlet port (209) fluidically connected to the annular region (301), and a gland packing (210) configured to seal against the proximal end (204) of the annular conduit (201),
   providing a gland packing push plate (211) configured to allow the proximal end (204) of the annular conduit (201) to pass through thereby forming an outlet port (212), the gland packing push plate (211) configured to form a fluid tight seal with the gland packing (210).

6. The in situ method to retrofit an assembly in a top entry valve of claim 5, wherein the top entry valve body is installed in cryogenic service.

7. The in situ method to retrofit an assembly in a top entry valve of claim 5, wherein the inlet port is connected to cryogenic service.

8. The in situ method to retrofit an assembly in a top entry valve of claim 5, wherein the outlet port is connected to cryogenic service.

* * * * *